US012206066B2

(12) United States Patent
Jung et al.

(10) Patent No.: US 12,206,066 B2
(45) Date of Patent: Jan. 21, 2025

(54) SOLID ELECTROLYTE, PREPARATION METHOD THEREOF, AND ELECTROCHEMICAL DEVICE INCLUDING THE SAME

(71) Applicant: Samsung Electronics Co., Ltd., Suwon-si (KR)

(72) Inventors: Sungkyun Jung, Suwon-si (KR); Hyeokjo Gwon, Hwaseong-si (KR); Jusik Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 245 days.

(21) Appl. No.: 17/404,002

(22) Filed: Aug. 17, 2021

(65) Prior Publication Data

US 2022/0166058 A1 May 26, 2022

(30) Foreign Application Priority Data

Nov. 24, 2020 (KR) ........................ 10-2020-0159089

(51) Int. Cl.
*H01M 10/05* (2010.01)
*H01M 4/38* (2006.01)
*H01M 10/0562* (2010.01)

(52) U.S. Cl.
CPC ....... *H01M 10/0562* (2013.01); *H01M 4/382* (2013.01); *H01M 2300/0074* (2013.01); *H01M 2300/008* (2013.01)

(58) Field of Classification Search
CPC ......... H01M 10/0562; H01M 10/0561; H01M 10/056; H01M 4/382; H01M 4/381; H01M 2300/0074; H01M 2300/008
See application file for complete search history.

(56) References Cited

U.S. PATENT DOCUMENTS

| 4,007,122 A | 2/1977 | Owens et al. |
| 7,998,622 B2 | 8/2011 | Inda |
| 2007/0048619 A1 | 3/2007 | Inda |
| 2014/0153230 A1* | 6/2014 | Mii .......... H01J 61/33 362/217.08 |
| 2015/0118571 A1 | 4/2015 | Liu et al. |
| 2019/0379056 A1* | 12/2019 | Chen ............ H01M 4/366 |
| 2020/0075993 A1 | 3/2020 | Ling et al. |
| 2020/0227775 A1* | 7/2020 | Wang ............ C04B 35/495 |
| 2021/0376378 A1 | 12/2021 | Jung et al. |

FOREIGN PATENT DOCUMENTS

| CN | 102867987 B | 11/2015 |
| CN | 110828904 A | 2/2020 |
| JP | 5197918 B2 | 5/2013 |
| JP | 2018174181 A | 11/2018 |
| KR | 1020210149619 A | 12/2021 |

OTHER PUBLICATIONS

Artur Trona et al., "The solid electrolytes Li2O—LiF—Li2WO4—B2O3 with enhanced ionic conductivity for lithium-ion battery," Journal of Industrial and Engineering Chemistry, Jan. 30, 2019, pp. 62-66, vol. 73.
S. Breuer et al., "Dispersed Solid Conductors: Fast Interfacial Li-Ion Dynamics in Nanostructured LiF and LiF:δ-Al2O3 Composites," J. Phys. Chem. C, Feb. 15, 2019, pp. 5222-5230, vol. 123.
Zheyi Zou et al., "Mobile Ions in Composite Solids," Chemical Reviews, Apr. 8, 2020, pp. 4169-4221, vol. 120, Issue 9.

* cited by examiner

*Primary Examiner* — Raymond Alejandro
(74) *Attorney, Agent, or Firm* — CANTOR COLBURN LLP

(57) ABSTRACT

A solid electrolyte includes: a crystalline composite, wherein the composite is a compound represented by Formula 1, a compound represented by Formula 2, or a combination thereof:

$$3\text{LiF-M1}_2\text{O}_3 \qquad \text{Formula 1}$$

wherein, in Formula 1, M1 is an element having an oxidation number of +3, or a combination thereof, with the proviso that M1 is not aluminum or yttrium, $$3\text{LiF-M2(OH)}_3 \qquad \text{Formula 2}$$

wherein, in Formula 2, M2 is an element having an oxidation number of +3, or a combination thereof, with the proviso that M2 is not aluminum or yttrium.

29 Claims, 9 Drawing Sheets

SOLID ELECTROLYTE, PREPARATION METHOD THEREOF, AND ELECTROCHEMICAL DEVICE INCLUDING THE SAME

CROSS-REFERENCE TO RELATED APPLICATION

This application claims priority to Korean Patent Application No. 10-2020-0159089, filed on Nov. 24, 2020, in the Korean Intellectual Property Office, and all the benefits accruing therefrom under 35 U.S.C. § 119, the content of which is incorporated herein by reference in its entirety.

BACKGROUND

1. Field

The present disclosure relates to solid electrolytes, preparation methods thereof, and electrochemical devices including the same.

2. Description of the Related Art

A solid secondary battery includes a cathode, a solid electrolyte, and an anode. It is desired for the solid electrolyte to have high ionic conductivity.

As the solid electrolyte, a sulfide-based solid electrolyte or an oxide-based solid electrolyte can be used. In order to use such a solid electrolyte in a solid secondary battery, it is advantageous to minimize a grain boundary between crystal particles in the solid electrolyte.

When a sulfide-based solid electrolyte is used as the solid electrolyte, it is possible to manufacture a cell through pressurization, but undesirable sulfide gas may be generated when the sulfide-based solid electrolyte is exposed to air. Therefore, in order to manufacture a solid secondary battery having excellent safety, efforts have been made to develop an oxide-based solid secondary battery that is stable in air. Despite all the advances, there is a continuing need for solid electrolytes having improved properties.

SUMMARY

Provided are novel solid electrolytes and preparation methods thereof.

Provided are electrochemical devices including the solid electrolytes.

Provided are electrochemical cells including the solid electrolytes.

Additional aspects will be set forth in part in the description which follows and, in part, will be apparent from the description, or may be learned by practice of the presented embodiments of the disclosure.

According to an aspect of an embodiment, a solid electrolyte includes: a crystalline composite, wherein the crystalline composite comprises a compound represented by Formula 1, a compound represented by Formula 2, or a combination thereof:

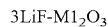

$3\text{LiF-M1}_2\text{O}_3$                                  Formula 1 wherein, in Formula 1, M1 is an element having an oxidation number of +3, or a combination thereof, with the proviso that M1 is not aluminum (Al) or yttrium (Y),

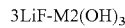

$3\text{LiF-M2(OH)}_3$                                   Formula 2 wherein, in Formula 2, M2 is an element having an oxidation number of +3, or a combination thereof, with the proviso that M2 is not aluminum (Al) or yttrium (Y).

According to an aspect of another embodiment, there is provided an electrochemical device including a cathode; an anode; and an electrolyte disposed between the cathode and the anode, wherein at least one of the cathode, the anode, or the electrolyte comprises the above-described solid electrolyte.

The electrochemical device may be at least one of an electrochemical cell, a storage battery, a super capacitor, a fuel cell, a sensor, or a discoloring device.

According to an aspect of another embodiment, there is provided an electrochemical cell including a cathode; an anode; and an electrolyte disposed between the cathode and the anode, wherein at least one of the cathode, the anode, or the electrolyte comprises the above-described solid electrolyte.

The electrochemical cell may be a secondary battery including the cathode, the anode, and a solid electrolyte layer disposed between the cathode and the anode, and at least one of the cathode, the anode, or the solid electrolyte layer may include the above-described solid electrolyte.

According to an aspect of another embodiment, a method of preparing the above-described solid electrolyte includes: providing a mixture of lithium hydroxide (LiOH) and metal fluoride at a mixing molar ratio of about 3:1; and mechanochemically mixing of the mixture to prepare the solid electrolyte.

A protected cathode includes a cathode; and a protective film comprising the solid electrolyte on the cathode.

A protected anode includes an anode; and a protective film comprising the solid electrolyte on the anode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
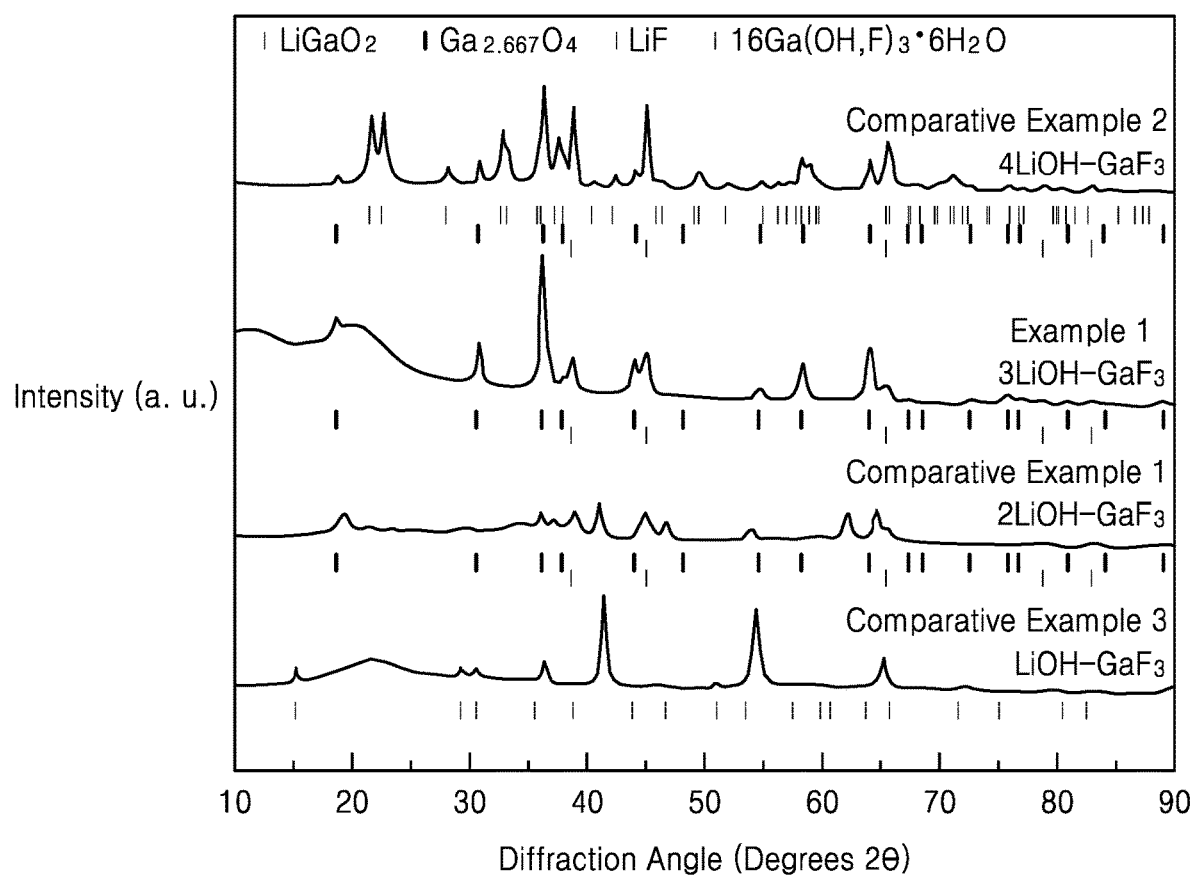
FIG. 1A is a graph of intensity (arbitrary units, a.u.) versus diffraction angle (degrees, 2θ) and illustrates X-ray diffraction (XRD) spectra for the composite of Example 1 and the composites of Comparative Examples 1 to 3.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a solid electrolyte, a preparation method thereof, an electrochemical device including the solid electrolyte, and an electrochemical cell including the solid electrolyte according to embodiments will be described in more detail.

A solid electrolyte includes: a crystalline composite, wherein the composite is a compound represented by Formula 1, a compound represented by Formula 2, or a combination thereof:

$$3LiF\text{-}M1_2O_3 \quad \text{Formula 1}$$

wherein, in Formula 1, M1 is an element having an oxidation number of +3, or a combination thereof, with the proviso that M1 is not aluminum (Al) or yttrium (Y),

$$3LiF\text{-}M2(OH)_3 \quad \text{Formula 1}$$

wherein, in Formula 2, M2 is an element having an oxidation number of +3, or a combination thereof, with the proviso that M2 is not aluminum (Al) or yttrium (Y).

In Formulas 1 and 2, each of M1 and M2 is independently Ga, Sc, In, a lanthanide element, or a combination thereof. The lanthanide elements include 15 rare earth elements from lanthanum having an atomic number of 57 to lutetium having an atomic number of 71. The lanthanide element may be, for example, Ce, Pr, Nd, Pm, Sm, Eu, Gd, Tb, Dy, Ho, Er, Tm, Yb, Lu, or a combination thereof.

In order to manufacture a solid secondary battery with excellent safety, research on an all-solid secondary battery employing an oxide-based solid electrolyte that is stable in air has been actively conducted.

However, since the oxide-based solid electrolyte can have poor formability, the interface between the cathode and the oxide solid electrolyte may contact non-uniformly. In order to solve the non-uniform contact between the cathode and the oxide-based solid electrolyte, a high-temperature sintering process of the cathode and the oxide-based solid electrolyte has been proposed. However, for the batteries manufactured according to this high-temperature sintering process, overall battery characteristics have not reached a satisfactory level while satisfying a battery configuration through complete solidification. Accordingly, improvement is desired.

As the solid electrolyte, there are garnet, argyrodite, and perovskite crystalline solid electrolytes, solid electrolytes having a single crystalline phase and transporting lithium in an open framework, or composite solid electrolytes. In order to improve the ion conductivity of lithium compounds such as lithium fluoride, lithium chloride, and lithium iodide, which are difficult to use due to low ion conductivity, research on matrix-dispersed phase crystalline solid electrolytes has been conducted.

Lithium fluoride, lithium chloride, lithium iodide, or the like may be used as the matrix, and alumina, silica, or the like may be used as the dispersed phase. However, such a solid electrolyte has room for improvement because its ion conductivity at room temperature may not reach a satisfactory level.

Accordingly, the present inventors provide a solid electrolyte having improved ion conductivity through the complexing of a crystalline material having low lithium conductivity.

The solid electrolyte comprises a crystalline composite, where the composite of the solid electrolyte according to an embodiment may comprise a compound represented by Formula 1, a compound represented by Formula 2, or a combination thereof.

$$3LiF\text{-}M1_2O_3 \quad\quad\quad \text{Formula 1}$$

wherein in Formula 1, M1 is an element having an oxidation number of +3, or a combination thereof, with the proviso that M1 is not aluminum (Al) or yttrium (Y), $$3LiF\text{-}M2(OH)_3 \quad\quad\quad \text{Formula 2}$$

wherein in Formula 2, M2 is an element having an oxidation number of +3, or a combination thereof, with the proviso that M2 is not aluminum (Al) or yttrium.

In Formula 1, M1 is Ga, Sc, a lanthanide element, or a combination thereof, and in Formula 2, M2 includes i) In, or M2 includes ii) In and at least one of Ga, Sc, or a lanthanide element.

In the composite according to an embodiment, a new phase may be formed at an interface between materials forming this composite, or lithium ion conductivity may be improved through a space charge layer.

The composite according to an embodiment comprises a product obtained by mechanochemically mixing of lithium hydroxide (LiOH) and metal fluoride, and the mixing molar ratio of LiOH and MF3 is about 3:1. The reaction product varies depending on the mixing molar ratio of LiOH and metal fluoride. Here, the metal fluoride may form a crystalline composite obtained by reacting with lithium hydroxide, and the metal fluoride and the molar ratio of the meta fluoride and lithium hydroxide may be selected to obtain composite containing a compound represented by Formula 1, a compound represented by Formula 2, or a combination thereof.

$$3LiF\text{-}M1_2O_3 \quad\quad\quad \text{Formula 1}$$

wherein in Formula 1, M1 is an element having an oxidation number of +3, or a combination thereof, with the provision that M1 is not aluminum (Al) or yttrium (Y), $$3LiF\text{-}M2(OH)_3 \quad\quad\quad \text{Formula 2}$$

wherein in Formula 2, M2 is an element having an oxidation number of +3, or a combination thereof, with the proviso that M2 is not aluminum (Al) or yttrium (Y).

The metal fluoride is, for example, $M1F_3$, $M2F_3$, or a combination thereof. Here, M1 and M2 are as defined in Chemical Formulas 1 and 2.

In the case of preparing the compound of Formula 1, as the metal fluoride, a fluoride containing Ga, Sc, a lanthanide element, or a combination thereof may be used. Further, in the case of preparing the compound of Formula 2, as the fluoride metal, a fluoride containing i) indium (In) and ii) Ga, Sc, a lanthanide element, or a combination thereof may be used.

Non-limiting examples of the metal fluoride may include $GaF_3$, $InF_3$, $ScF_3$, $LaF_3$, $CeF_3$, $PrF_3$, $EuF_3$, $NdF_3$, $TbF_3$, $GdF_3$, $SmF_3$, $HoF_3$, $TmF_3$, or a combination thereof.

As used herein, the "mechanochemical mixing" or "mechanochemically mixing" refers to a mechanical and chemical milling and/or pulverizing process. Mechanochemical mixing may include, for example, mechanical milling and the like.

The composite according to an embodiment is not restricted by a specific theory, but may be obtained according to Reaction Scheme 1 or Reaction Scheme 2 below.

$$3LiF+M1_2O_3 \rightarrow 3LiF+1/2M1_2O_3+3/2H_2O \quad \text{Reaction Scheme 1}$$

In Reaction Scheme 1, M1 is as defined in Formula 1, for example, Ga.

$$3LiF+M2F_3 \rightarrow 3LiF+M2(OH)_3 \quad \text{Reaction Scheme 2}$$

In Reaction Scheme 2, M2 is as defined in Formula 2, for example, In.

Reaction Scheme 1 may be carried out by a dehydration reaction, and Reaction Scheme 2 may be carried out by a substitution reaction.

The composite may be, for example, $3LiF$—$Ga_2O_3$, $3LiF$—$In(OH)_3$, $3LiF$—$Sc_2O_3$, $3LiF$—$La_2O_3$, $3LiF$—$Ce_2O_3$, $3LiF$—$Pr_2O_3$, $3LiOH$—$EuF_3$, $3LiF$—$Eu_2O_3$, $3LiF$—$Nd_2O_3$, $3LiF$—$Tb_2O_3$, $3LiF$—$Gd_2O_3$, $3LiF$—$Sm_2O_3$, $3LiF$—$Ho_2O_3$, $3LiF$—$Tm_2O_3$, or a combination thereof.

The ion conductivity of the solid electrolyte at room temperature (25° C.) is about $10^{-5}$ siemens per centimeter (S/cm) or more, about $10^{-4}$ S/cm or more, about $2\times10^{-4}$ S/cm or more, about $10^{-5}$ S/cm to about $1\times10^{-2}$ S/cm, about $10^{-4}$ S/cm to about $10^{-3}$ S/m, or about $3\times10^{-4}$ S/cm to about $9\times10^{-4}$ S/cm. The ion conductivity of the solid ion conductor can be measured by electrochemical impedance spectroscopy (EIS). See, for example, J.-M. Winand et al., "Measurement of Ionic Conductivity in Solid Electrolytes," Europhysics Letters, vol. 8, no. 5, p. 447-452, 1989, the content of which is included herein by reference.

The solid electrolyte according to an embodiment has high ion conductivity, so that the internal resistance of an electrochemical cell including this solid electrolyte is further reduced.

The solid electrolyte has activation energy of about 200 mega electron volt (meV) to about 445 meV, about 220 meV to about 420 meV, about 240 meV to about 400 meV, or about 260 meV to about 380 meV at 25° C. The activation energy is measured from a plot of LN (σT) [LN(S-K/m)] vs. 1000/T[1/K]. The lower the activation energy, the easier Li ions can conduct.

M1 in Formula 1 and M2 in Formula 2 are elements each having an oxidation number of +3, for example, Ga, Sc, a lanthanide element, or a combination thereof. As used herein, the "oxidation number" may refer to an average oxidation number.

In Formula 2, M2 includes i) In, or M2 includes ii) In and Ga, Sc, a lanthanide element, or a combination thereof.

The lanthanide element is, for example, Ce, Pr, Nd, Pm, Sm, Eu, Gd, Tb, Dy, Ho, Er, Tm, Yb, Lu, or a combination thereof.

In an embodiment, the crystalline composite, when analyzed by X-ray diffraction using CuKα radiation, can have a primary peak at a diffraction angle of about 35° 2θ to about 38° 2θ, and secondary peaks at a diffraction angle of about 30° 2θ to about 32° 2θ, about 57° 2θ to about 60° 2θ, and at about 63° 2θ to about 65° 2θ, respectively. Here, the primary peak has a maximum intensity, the primary peak and the secondary peak are related to crystalline properties such as LiCl, and the secondary peak has lower intensity than the primary peak.

In an aspect, the crystalline composite does not have a peak at a diffraction angle of about 23° 2θ to about 27° 2θ when analyzed by X-ray diffraction using CuKα radiation.

The intensity ratio of the primary peak (peak A) at the diffraction angle of about 35° 2θ to about 38° 2θ and the secondary peak (peak B) at the diffraction angle of about 30° 2θ to about 32° 2θ is about 1:0.25 to about 1:0.35 or about 1:0.35 to about 1:0.45. The an intensity ratio of the primary peak (peak A) and the secondary peak (peak C) at the diffraction of about 57° 2θ to about 60° 2θ is about 1:0.25 to about 1:0.35 or about 1:0.29 to about 0.31, and the intensity ratio of the primary peak (peak A) and the secondary peak (peak D) at the diffraction angle of about 63° 2θ to about 65° 2θ is about 1:0.3 to about 1:0.5 or about 1:0.35 to about 1:0.45.

The crystalline composite, when analyzed by X-ray diffraction using CuKα radiation, can have a primary peak (peak A-1) at a diffraction angle of about 22° 2θ to about 23° 2θ, and a secondary peak (peak B-1) at a diffraction angle of about 31° 2θ to about 33° 2θ. The solid electrolyte having these properties is, for example, $3LiF$—$Ga_2O_3$.

The intensity ratio of the primary peak A-1 and the secondary peak B-1 is about 1:0.5 to about 1:0.6, about 1:0.52 to about 1:0.58, or about 1:0.55 to about 1:0.57.

The crystalline composition, when analyzed by X-ray diffraction using CuKα radiation, can have a primary peak (peak A-2) at a diffraction angle of about 22° 2θ to about 23° 2θ, a secondary peak (peak B-2) at a diffraction angle of about 31° 2θ to about 33° 2θ, a secondary peak (peak B-3) at a diffraction angle of about 50° 2θ to about 52° 2θ, and a secondary peak (peak B-4) at a diffraction angle of about 55° 2θ to about 57° 2θ, respectively. The solid electrolyte having these properties contains, for example, $In(OH)_3$.

The intensity ratio of the primary peak A-2 and the secondary peak B-2 is about 1:0.5 to about 1:0.6, about 1:0.52 to about 1:0.58, or about 1:0.55 to about 1:0.57, and the intensity ratio of the primary peak A-2 and the secondary peak B-3 is about 1:0.4 to about 1:0.45, about 1:0.41 to about 1:0.44, or about 1:0.42 to about 1:0.43. Further, the intensity ratio of the primary peak A-2 and the secondary peak B-4 is about 1:0.15 to about 1:0.18 or about 1:0.16 to about 1:0.17.

The solid electrolyte according to an embodiment may be thinned to a thickness of 100 μm or less. The thickness of the solid electrolyte is about 1 μm to about 100 μm, for example about 1 μm to about 50 μm. The composition of the solid electrolyte may be analyzed through an inductively coupled plasma spectrometer (ICP).

The solid electrolyte according to an embodiment is electrochemically stable to lithium metal at about 2.0 V to about 4.6 V, for example, about 2.4 V to about 4.1 V. "Electrochemical stable" means that the solid electrolyte is neither oxidized or reduced at the recited potential and in contact with lithium. An electrochemical stability window for a solid electrolyte can be evaluated using cyclic voltammetry using a symmetric cell wherein the solid electrolyte is between lithium metal electrodes.

The composite of formula 1 or the composite of formula 2 may exist in the form of particles. The average particle diameter of the particles is about 5 nanometers (nm) to about 500 micrometers (μm), for example about 100 nm to about 100 μm, for example about 1 μm to about 50 μm, and the specific surface area thereof is about 0.01 square meters per gram ($m^2$/g) to about 1000 $m^2$/g, for example, about 0.5 $m^2$/g to about 100 $m^2$/g. The particle diameter may be determined by light scattering. The average particle diameter means number average.

A method of manufacturing a solid electrolyte according to an embodiment is described as follows.

First, a mixture of lithium hydroxide (LiOH) and metal fluoride is provided at a mixing molar ratio of about 3:1; a solid electrolyte may be obtained by mechanochemically mixing of the mixture.

Non-limiting examples of the metal fluoride may include $GaF_3$, $InF_3$, $ScF_3$, $LaF_3$, $CeF_3$, $PrF_3$, $EuF_3$, $NdF_3$, $TbF_3$, $GdF_3$, $SmF_3$, $HoF_3$, $TmF_3$, or a combination thereof.

Mechanochemical mixing refers to a process in which a dehydration reaction or a substitution reaction proceeds by contacting LiOH with a metal fluoride. Mechanochemical mixing is, for example, mechanical milling.

Mechanical milling uses a principle in which coating is performed by bonding and/or fusion between interfaces having high surface energy generated by mechanical energy. Mechanical milling may be carried out by mechanically rubbing the components of the mixture, for example, by rotating at a rotation speed of about 100 rotations per minute (rpm) to about 3,000 rpm, about 300 rpm to about 1,000 rpm, or about 500 to about 800 rpm to apply a compressive stress mechanically. The mechanical milling may be performed by any one method of ball milling, air jet milling, bead milling, roll milling, planetary milling, hand milling, high-energy ball milling, planetary ball milling, stirred ball milling, vibration milling, mechanofusion milling, shaker milling, attritor milling, disk milling, shape milling, nauta milling, nobilta milling, high-speed mixing, and combinations thereof. However, the present disclosure is not limited thereto.

The mechanical milling may be performed using a ball mill, an air jet mill, a bead mill, a roll mill, a planetary mill, a hand mill, or the like.

The mechanical milling may be carried out, for example, under an inert gas atmosphere. The inert gas atmosphere may be made using nitrogen, argon, helium, or a combination thereof.

According to one embodiment, the temperature of the reaction mixture may be controlled to be suitable for a dehydration reaction through the mechanical milling.

After the mechanical milling, the method may further include a conditioning process, if necessary. Through the conditioning process, the temperature of the product having undergone the mechanical milling may be cooled. Through the conditioning process, the temperature of the product having undergone the mechanical milling may be controlled to 120° C. or lower, for example, about 20° C. to about 60° C.

The solid electrolyte according to an embodiment can be prepared without a separate heat treatment process, unlike the process of preparing a known solid electrolyte. After the mechanical milling of the mixture to obtain a solid electrolyte, a separate heat treatment process may be omitted. If the heat treatment process is further performed, it is difficult to obtain the solid electrolyte according to an embodiment.

If the mechanical milling of the mixture is carried out as described above, the particle size of the product obtained through the mechanical milling may be controlled. The particle size of the product obtained through the mechanical milling may be controlled to 1 μm or less, about 0.01 μm to about 0.9 μm, about 0.01 μm to about 0.7 μm, for example, about 0.01 μm to about 0.5 μm. When the particle size thereof is controlled in this way, a solid electrolyte having improved density may be finally obtained. As used herein, the "particle size" indicates a particle diameter when the particle is spherical, and indicates a length of major axis of the particle when the particle is not spherical. The particle diameter may be determined by light scattering.

The mechanical milling is, for example, high-energy milling. Such high-energy milling may use, for example, Pulverisette 7 Premium line equipment. When high-energy milling is performed in this way, the size of the components of the mixture may be miniaturized, so that these reactions may be easily conducted, and thus a solid electrolyte may be prepared within a short time.

After the conditioning process, the mechanical milling process and the conditioning process may be repeatedly performed. One cycle consisting of a mechanical milling process and a conditioning process may be repeatedly performed, for example, a total of 50 to 100 cycles may be performed.

The above-described mechanical milling time and conditioning time can be varied, but, for example, the conditioning time may be controlled to be shorter than that of the mechanical milling time. The mechanical milling time is about 5 minutes to about 20 hours, for example, about 5 hours to about 15 hours, and the conditioning time is about 1 minute to about 15 minutes, about 2 minutes to about 10 minutes, or 5 minutes.

According to an aspect of another embodiment, there is provided an electrochemical device including a cathode; an anode; and an electrolyte disposed between the cathode and the anode, wherein at least one of the cathode, the anode, or the electrolyte comprises the solid electrolyte according to an embodiment.

The electrochemical device is at least one of an electrochemical cell, a storage battery, a super capacitor, a fuel cell, a sensor, or a discoloring device. The sensor may be, for example, a moisture sensor.

According to an aspect of another embodiment, there is provided an electrochemical cell including the solid electrolyte according to an embodiment. The electrochemical cell comprising a cathode; an anode; and an electrolyte disposed between the cathode and the anode, wherein at least one of the cathode, the anode, or the electrolyte comprises the solid electrolyte.

The electrochemical cell may be a secondary battery including a cathode, an anode, and a solid electrolyte layer disposed between the cathode and the anode.

The secondary battery may include a cathode, an anode containing lithium, and a solid electrolyte layer disposed between the cathode and the anode. The solid electrolyte layer can comprise the solid electrolyte as described herein. The secondary battery is, for example, a lithium secondary battery, a lithium air battery, a solid secondary battery, etc., and among them, may be a solid secondary battery.

The electrochemical cell can be used for both primary and secondary batteries, and the shape of the electrochemical cell is not particularly limited, and is, for example, a coin type, a button type, a sheet type, a stacked type, a cylinder type, a flat type, or a horn type. The electrochemical cell according to an embodiment may also be used in medium and large-sized batteries for electric vehicles.

The electrochemical cell may be, for example, a solid secondary battery using a precipitation-type anode. The precipitation-type anode refers to an anode which has a non-anode coating layer containing no anode active material during the assembly of the electrochemical cell but in which an anode material such as lithium metal is precipitated after the charging of the electrochemical cell.

The electrochemical cell can further comprise a protective film on the cathode, the anode, the solid electrolyte layer, or a combination thereof, wherein the protective film comprises the solid electrolyte.

Since the solid electrolyte according to an embodiment has a high oxidation stability potential of 3.5 V vs. Li/Li+ or more, for example 4.6 to 5.0 V vs. Li/Li+, it may be used as a cathode electrolyte, for example, a cathode electrolyte (catholyte) for all-solid secondary batteries.

The solid electrolyte according to an embodiment may replace an ionic liquid-containing electrolyte in a solid secondary battery employing an existing oxide-based solid electrolyte or sulfide-based solid electrolyte.

The solid electrolyte according to an embodiment may be prepared without a sintering process by using the composite according to an embodiment.

The solid secondary battery according to an embodiment may further include an oxide-based solid electrolyte, a sulfide-based solid electrolyte, or a combination thereof, which is stable in air.

The solid secondary battery may have a structure including a cathode/solid electrolyte according to an embodiment/oxide-based solid electrolyte/lithium anode or may have a structure including a cathode/solid electrolyte according to an embodiment/sulfide-based solid electrolyte/lithium anode according to one embodiment.

The solid secondary battery according to an embodiment may further include an ionic liquid-containing electrolyte and an oxide-based solid electrolyte to have a structure including a cathode/ionic liquid-containing electrolyte/oxide-based solid electrolyte/solid electrolyte according to an embodiment/oxide-based solid electrolyte/lithium anode.

The solid secondary battery according to an embodiment may further include an ionic liquid-containing electrolyte and a sulfide-based solid electrolyte to have a structure including a cathode/ionic liquid-containing electrolyte/sulfide-based solid electrolyte/solid electrolyte according to an embodiment/sulfide-based solid electrolyte/lithium anode.

The lithium anode may be a lithium metal electrode or a lithium alloy electrode. When employing a lithium anode as described above, high energy density per volume of a solid secondary battery may be realized.

The oxide-based solid electrolyte may be garnet-based ceramics $Li_{3+x}La_3M_2O_{12}$ (M=Te, Nb, Zr, or a combination thereof, x is an integer of 1 to 10), lithium phosphorus oxynitride (LiPON) $Li_xPO_yN_z$ (0<x<1, 0<y<1, 0<z<1), $Li_xP_yO_zN_K$ (2.7≤x≤3.3, 0.8≤y≤1.2, 3.5≤z≤3.9, 0.1≤k≤0.5), $Li_wPO_xN_yS_z$(0<w<1, 0<x<1, 0<y<1, 0<z<1), $Li_{1+x+y}Al_xTi_{2-x}Si_yP_{3-y}O_{12}$ (0<x<2, 0≤y<3), $BaTiO_3$, $Pb(Zr_xTi_{1-x})O_3$(PZT)(0≤x≤1), $Pb_{1-x}La_xZr_{1-y}Ti_yO_3$(PLZT)(0≤x<1, 0≤y<1), $Pb(Mg_{1/3}Nb_{2/3})O_3$—$PbTiO_3$(PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $Li_{1+x+y}(Al_aGa_{1-a})_x(Ti_bGe_{1-b})_{2-x}Si_yP_{3-y}O_{12}$ (0≤x≤1, 0≤y≤1, 0≤a≤1, and 0≤b≤1), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride-based glass ($Li_xN_y$, 0<x<4, 0<y<2), $SiS_2(Li_xSi_yS_z$, 0<x<3, 0<y<2, 0<z<4), $P_2S_5$-based glass ($Li_xP_yS_z$, 0<x<3, 0<y<3, 0<z<7), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, or a combination thereof.

As the oxide-based solid electrolyte, for example, a garnet-based oxide-based solid electrolyte having excellent reduction stability upon contact with a lithium anode may be used. As the garnet-based ceramics $Li_{3+x}La_3M_2O_{12}$ (M=Te, Nb, Zr, or a combination thereof), LLZO ($Li_{6.5}La_3Zr_{1.5}Ta_{0.5}O_{12}$) may be used.

The sulfide-based solid electrolyte may include, for example, an argyrodite type solid electrolyte represented by Formula 3 below:

$Li^+_{12-n-x}A^{n+}X^{2-}_{6-x}Y'^-_x$.    Formula 3

In Formula 3, A is P, As, Ge, Ga, Sb, Si, Sn, Al, In, Ti, V, Nb, or Ta, X is S, Se, Te, or a combination thereof, Y' is Cl, Br, I, F, CN, OCN, SCN, $N_3$, or a combination thereof, and 1≤n≤5, 0≤x≤2.

The sulfide-based solid electrolyte may be, for example, an argyrodite type compound including at least one of $Li_{7-x}PS_{6-x}Cl_x$ (0≤x≤2), $Li_{7-x}PS_{6-x}Br_x$ (0≤x≤2), or $Li_{7-x}PS_{6-x}I_x$ (0≤x≤2). The sulfide-based solid electrolyte may be, for example, an argyrodite type compound including at least one of $Li_6PS_5Cl$, $Li_6PS_5Br$, or $Li_6PS_5I$.

The sulfide-based solid electrolyte is, for example, at least one of $Li_2S$—$P_2S_5$, $Li_2S$—$P_2S_5$—LiX (X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n are each a positive number, and Z is one of Ge, Zn, and Ga), $Li_2S$—$GeS_2$, $Li_2S$—$SiS_2$—$Li_3PO_4$, $Li_2S$—$SiS_2$—$Li_pMO_q$ (p and q are each a positive number, and M is one of P, Si, Ge, B, Al, Ga, and In), $Li_{7-x}PS_{6-x}Cl_x$ (0≤x≤2), $Li_{7-x}PS_{6-x}Br_x$ (0≤x≤2), or $Li_{7-x}PS_{6-x}I_x$ (0≤x≤2).

The solid electrolyte according to an embodiment may be used as a cathode protective film in a solid secondary battery to which an oxide-based solid electrolyte or a sulfide-based solid electrolyte, stable in air, is used, so that a reaction between the solid electrolyte and the cathode may be effectively reduced. In addition, the solid electrolyte according to an embodiment may be used as a cathode coating material to be used as a cathode protective film.

Figure 3A:
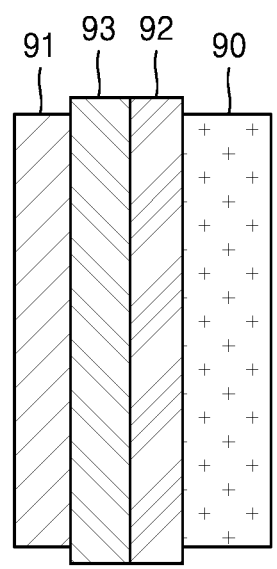
FIG. 3A is a cross-sectional view illustrating a schematic configuration of an embodiment of a solid secondary battery.

FIG. 3A is a schematic cross-sectional view illustrating a structure of a solid secondary battery according to another embodiment.

Referring to FIG. 3A, a first oxide-based solid electrolyte 93 and a solid electrolyte 92 according to an embodiment are sequentially disposed on an anode 91, and a cathode 90 is disposed adjacent to the solid electrolyte 92. In this way, the solid electrolyte 92 is disposed between the first oxide-based solid electrolyte 93 and the cathode 90, so that an interface between the solid electrolyte and the cathode may be uniformly contacted without an ionic liquid-containing electrolyte. Further, the solid electrolyte 92 may have excellent compatibility with the first oxide-based solid electrolyte 93, and may be used as a cathode electrolyte by replacing an ionic liquid-containing electrolyte known in the art. The ionic liquid-containing electrolyte may be, for example, a liquid electrolyte containing an ionic liquid.

The ionic liquid may be, for example, at least one of N-methyl-N-propylpyrrolidinium bis(trifluoromethanesulfonyl)imide, N-butyl-N-methylpyrrolidium bis(3-trifluoromethylsulfonyl)imide, 1-butyl-3-methylimidazolium bis(trifluoromethylsulfonyl)imide, or 1-ethyl-3-methylimidazolium bis(trifluoromethylsulfonyl)imide.

Figure 3B:
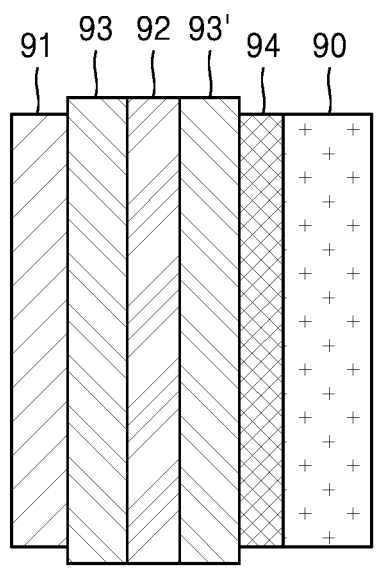
FIG. 3B is a cross-sectional view illustrating a schematic configuration of another embodiment of a solid secondary battery.

FIG. 3B illustrates a structure of a solid secondary battery according to an embodiment.

An ionic liquid-containing electrolyte 94 is disposed on a cathode 90, and a second oxide-based solid electrolyte 93', a solid electrolyte 92 according to an embodiment, and a first oxide-based solid electrolyte 93 are sequentially disposed on the ionic liquid-containing electrolyte 94. An anode 91 is disposed adjacent to the first oxide-based solid electrolyte 93, and the anode 91 may be a lithium anode.

Due to the presence of the solid electrolyte 92 according to an embodiment, it is not necessary to apply high pressure for complete solidification of the battery, and the cathode and the solid electrolyte may be very uniformly contacted at the interface.

A configuration of a solid secondary battery 1 according to another embodiment will be described with reference to FIG. 4.

Figure 4:
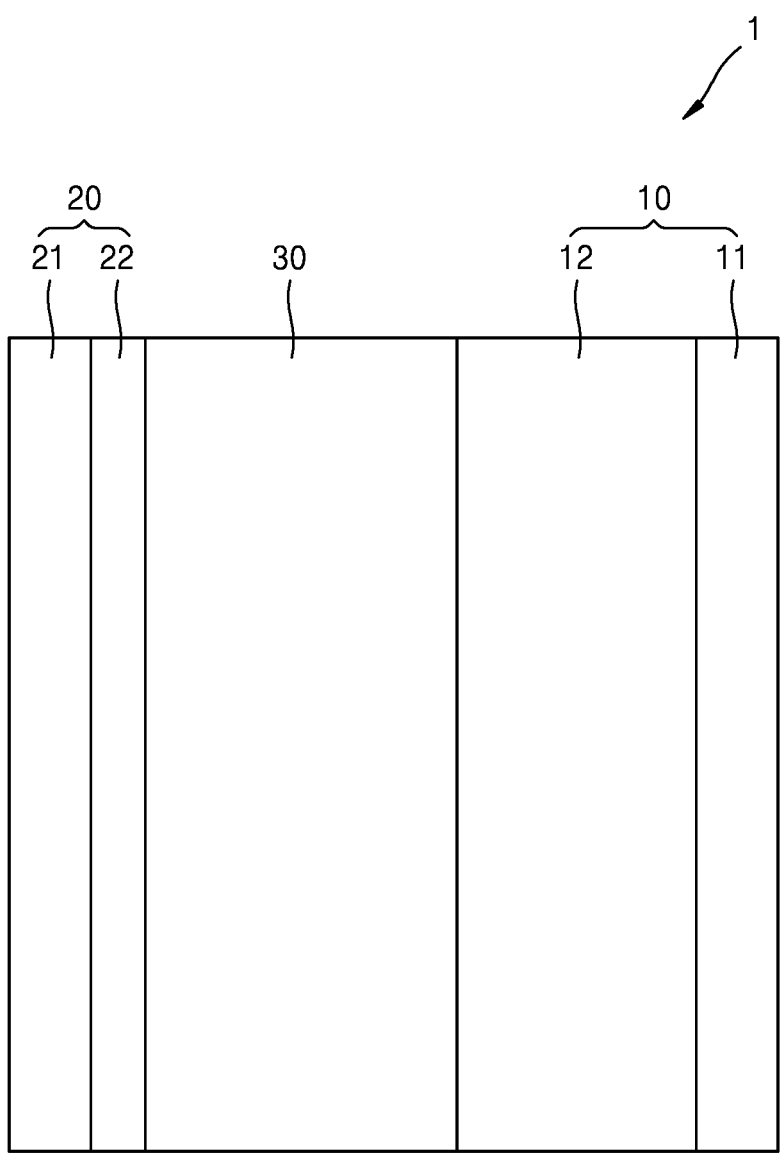
FIG. 4 is a cross-sectional view illustrating a schematic configuration of still another embodiment of a solid secondary battery.

As shown in FIG. 4, a solid secondary battery may include a cathode 10, an anode 20, and a solid electrolyte layer 30 according to an embodiment.

The cathode 10 may include a cathode current collector 11 and a cathode active material layer 12.

As the cathode current collector 11, a plate or foil made of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 may include a cathode active material and a solid electrolyte. The solid electrolyte included in the cathode 10 may be similar to or different from the solid electrolyte included in the solid electrolyte layer 30.

The cathode active material may be any cathode active material capable of reversibly occluding and releasing lithium ions. For example, the cathode active material may be formed using lithium cobalt oxide (hereinafter referred to as LCO), lithium nickel oxide, lithium nickel cobalt oxide, lithium nickel cobalt aluminum oxide (hereinafter referred to as NCA), lithium nickel cobalt manganese oxide (hereinafter referred to as NCM), lithium manganate, lithium iron phosphate, nickel sulfide, copper sulfide, lithium sulfide, iron oxide, or vanadium oxide. Such cathode active materials may be used alone or in combination of two or more.

The cathode active material may be, for example, a lithium salt of a three-component transition metal oxide such as $LiNi_xCo_yAl_zO_2$ (NCA) or $LiNi_xCo_yMn_zO_2$ (NCM) (here, $0<x<1$, $0<y<1$, $0<z<1$, and $x+y+z=1$).

The cathode active material may be covered by a coating layer. Here, the coating layer of the present embodiment may be used without limitation as long as it is known as a coating layer of a cathode active material of a solid secondary battery. The coating layer may include, for example, $Li_2O$—$ZrO_2$.

Further, when the cathode active material is formed of a lithium salt of a three-component transition metal oxide such as NCA or NCM, and contains nickel (Ni), the capacity density of the solid secondary battery 1 may increase, thereby decreasing the metal elution of the cathode active material in a charged state. Accordingly, long-term reliability and cycle characteristics of the solid secondary battery 1 according to the present embodiment in a charged state may be improved.

Here, as the shape of the cathode active material, for example, a particle shape such as an ellipse or a sphere may be exemplified. The particle diameter of the cathode active material is not particularly limited, and may be within a range applicable to the cathode active material of a conventional solid secondary battery. Further, the content of the cathode active material of the cathode 10 is also not particularly limited, and may be within a range applicable to the cathode of a conventional solid secondary battery.

The cathode 10 may appropriately include additives such as a conductive agent, a binder, a filler, a dispersant, and an ion conductive aid, or a combination thereof in addition to the above-described cathode active material and solid electrolyte.

Examples of the conductive agent that may be blended in the cathode 10 may include graphite, carbon black, acetylene black, Ketjen black, carbon fiber, and metal powder. Examples of binder that may be blended in the cathode 10 may include styrene butadiene rubber (SBR), polytetrafluoroethylene, polyvinylidene fluoride, and polyethylene. As the coating agent, dispersant, ion conductive aid, and the like. that may be blended in the cathode 10, any suitable material used for electrodes of solid secondary batteries may be used.

The anode 20 may include an anode current collector 21 and a non-anode coating layer 22.

Although the non-anode coating layer 22 is shown in FIG. 4, it may be a known anode active material layer. For example, as shown in FIGS. 3A and 3B, the anode 20 may be an iridium electrode.

The non-anode coating layer 22 contains, for example, a metal such as silicon and carbon, and may have a structure in which a conductive binder is disposed around the metal and carbon.

The thickness of the non-anode coating layer 22 is about 1 μm to about 20 μm, about 3 μm to about 18 μm, or about 5 μm to about 15 μm. The anode current collector 21 may be made of a material that does not react with lithium, that is, a material that does not form both an alloy and a compound. As the material constituting the anode current collector 21, copper (Cu), stainless steel, titanium (Ti), iron (Fe), cobalt (Co), and nickel (Ni) are exemplified. The anode current collector 21 may be made of one kind of metal, or may be made of an alloy of two or more kinds of metals or a coating material. The anode current collector 21 may be formed in the shape of a plate or foil.

Figure 5:
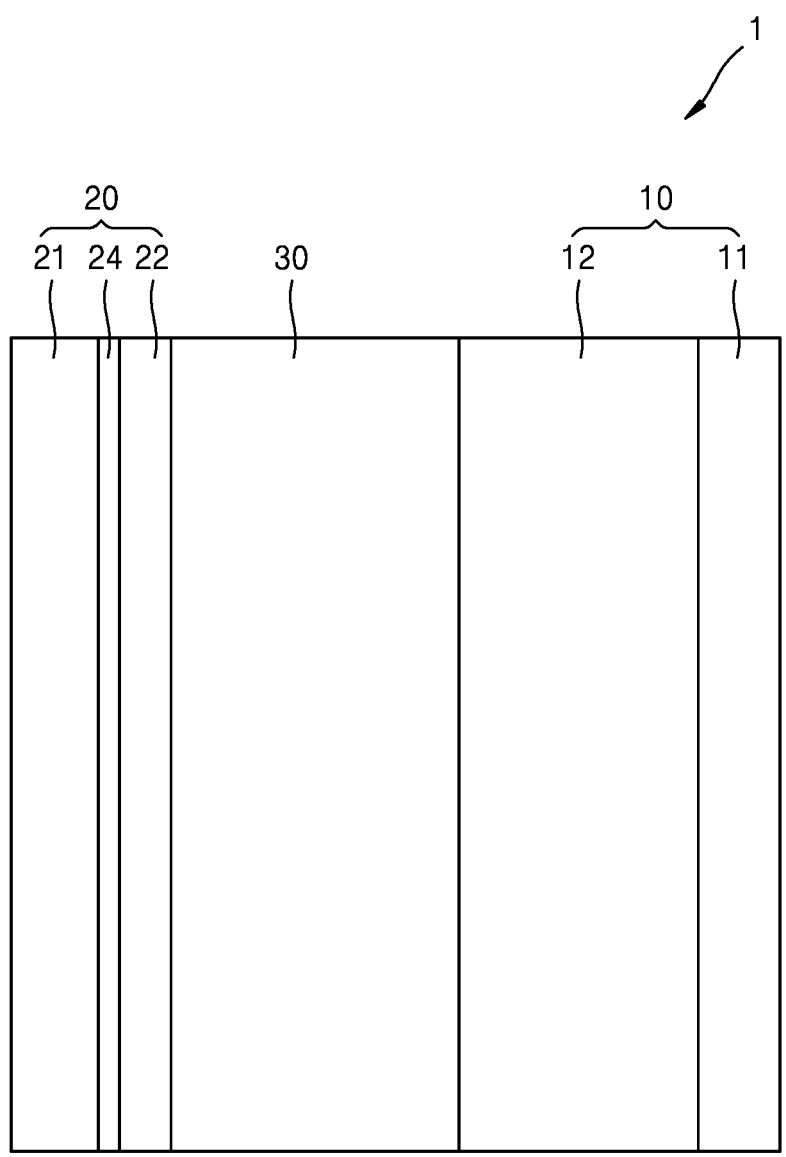
FIG. 5 is a cross-sectional view illustrating a schematic configuration of yet another embodiment of a solid secondary battery.
Figure 6:
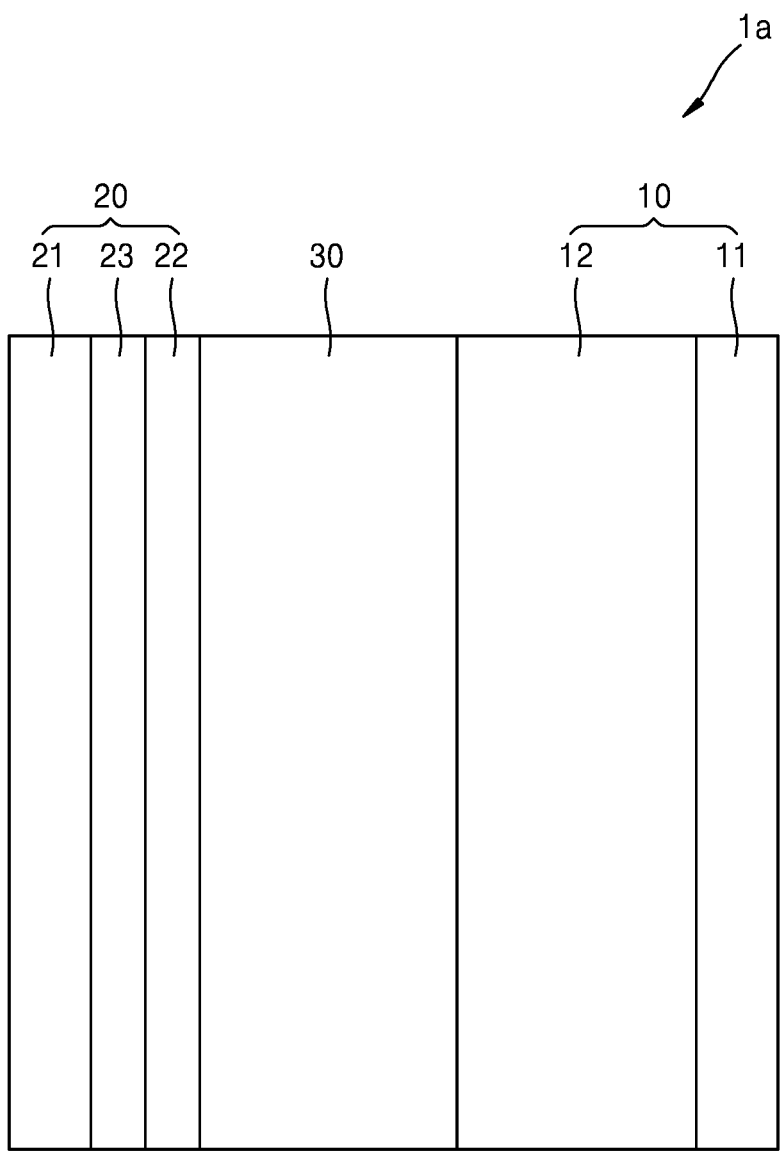
FIG. 6 is a cross-sectional view illustrating a schematic configuration of another embodiment of a solid secondary battery.

Here, as shown in FIG. 5, a thin film 24 may be formed on the surface of the anode current collector 21. The thin film 24 may include an element capable of forming an alloy with lithium. The element capable of forming an alloy with lithium may be, for example, gold, silver, zinc, tin, indium, silicon, aluminum, or bismuth. The thin film 24 may be formed of one of these metals or may be formed of several types of alloys thereof. Due to the presence of the thin film 24, the precipitation pattern of a metal layer 23 shown in FIG. 6 may be further flattened, and the characteristics of the solid secondary battery 1 may be further improved.

Here, the thickness of the thin film 24 is not particularly limited, but may be about 1 nm to about 500 nm, about 5 nm to about 450 nm, about 10 nm to about 400 nm, or about 50 nm to about 350 nm. When the thickness of the thin film 24 is within the above range, the function of the thin film 24 is sufficiently exhibited and the precipitation amount of lithium in the anode is appropriate, so that the characteristics of the solid secondary battery 1 are excellent. The thin film 24 may be formed on the anode current collector 21 by a vacuum deposition method, a sputtering method, a plating method, or the like.

The non-anode coating layer 22 may include an anode active material forming an alloy or compound with lithium.

The anode active material may be, for example, amorphous carbon, gold (Au), platinum (Pt), palladium (Pd), silicon (Si), silver (Ag), aluminum (Al), bismuth (Bi), tin (Sn), zinc (Zn), or a combination thereof. Here, as amorphous carbon, for example, carbon black (CB), acetylene black (AB), furnace black (FB), ketjen black (KB), and graphene may be exemplified.

The non-anode coating layer 22 may include only one of these negative active materials or may include two or more of these negative active materials. For example, the non-anode coating layer 22 may include only amorphous carbon as the anode active material, or may include at least one selected from gold, platinum, palladium, silicon, silver, aluminum, bismuth, tin, and zinc. Alternatively, the non-anode coating layer 22 may include a mixture of amorphous carbon and at least one of gold, platinum, palladium, silicon, silver, aluminum, bismuth, tin, or zinc. The mixing weight ratio of amorphous carbon and gold or the like in the mixture may be, for example, about 10:1 to about 1:2. Since the anode active material is made of such a material, the characteristics of the solid secondary battery 1 may be further improved.

Here, when at least one of gold, platinum, palladium, silicon, silver, aluminum, bismuth, tin, or zinc is used as the anode active material, the particle size (for example, average particle diameter) of the anode active material may be about 4 μm or less, for example about 10 nm to about less than about 4 μm, about 50 nm to about 3 μm, or about 100 nm to about 2 μm. In this case, the characteristics of the solid secondary battery 1 may be further improved. Here, as the particle diameter of the anode active material, for example, a median diameter (so-called D50) measured using a laser particle size distribution meter may be used. In the following Examples and Comparative Examples, particle diameters were measured by this method. The lower limit of the particle diameter is not particularly limited, but may be about 10 nm.

Alternatively, the anode active material may include a mixture of first particles formed of amorphous carbon and second particles formed of metal or semiconductor. The metal or semiconductor may include, for example, gold, platinum, palladium, silicon, silver, aluminum, bismuth, tin, zinc, or a combination thereof. Here, the content of the second particles may be about 8 wt % to about 60 wt % or about 10 wt % to 50 wt % based on the total weight of the mixture. In this case, the characteristics of the solid secondary battery 1 may be further improved.

The thickness of the non-anode coating layer 22 is not particularly limited as long as it satisfies the requirements of Equation 1 above, but may be about 1 μm to about 20 μm, about 3 μm to about 18 μm, or about 5 μm to about 10 μm. When the thickness of the non-anode coating layer 22 is within the above range, the characteristics of the solid secondary battery 1 are sufficiently improved. When the aforementioned binder is used, the thickness of the non-anode coating layer 22 may be easily secured to an appropriate level.

In the non-anode coating layer 22, additives used in solid batteries, for example, a filler, a dispersant, and ion conductive agent may be appropriately blended.

The solid electrolyte layer may comprise a solid electrolyte according to an embodiment, and a second solid electrolyte.

A second solid electrolyte may be for example, an oxide-based solid electrolyte, a sulfide-based solid electrolyte, or a combination thereof.

The material of the sulfide-based solid electrolyte may be, for example, $Li_2S$—$P_2S_5$, $Li_2S$—$P_2S_5$—LiX (X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n are each a positive number, and Z is one of Ge, Zn, and Ga), $Li_2S$—$GeS_2$, $Li_2S$—$SiS_2$—$Li_3PO_4$, or $Li_2S$—$SiS_2$—$Li_pMO_q$ (p and q are each a positive number, and M is one of P, Si, Ge, B, Al, Ga, and In), or a combination thereof. Here, the sulfide-based solid electrolyte is produced by treating a starting material (for example, $Li_2S$, $P_2S_5$, or the like) by a melt quenching method or a mechanical milling method. After this treatment, heat treatment may be performed. The solid electrolyte may be amorphous, crystalline, or a mixed state thereof.

As the solid electrolyte, a sulfide-based solid electrolyte including at least sulfur (S), phosphorus (P), and lithium (Li) of the aforementioned elements may be used. For example, a sulfide-based solid electrolyte including $Li_2S$—$P_2S_5$ may be used. Here, when the sulfide-based solid electrolyte including $Li_2S$—$P_2S_5$ is used as the solid electrolyte, the mixing molar ratio of $Li_2S$ and $P_2S_5$ may be selected in the range of, for example, $Li_2S$:$P_2S_5$=50:50 to 90:10.

The solid electrolyte 30 may further include a binder. The binder included in the solid electrolyte layer 30 may be, for example, styrene butadiene rubber (SBR), polytetrafluoroethylene, polyvinylidene fluoride, or polyethylene, or a combination thereof. The binder of the solid electrolyte 30 may be the same as or different from the binder of the cathode active material layer 12 and the binder of the non-anode coating layer 22.

Hereinafter, the present disclosure will be described in more detail through the following Examples and Comparative Examples. However, the following Examples are set forth to illustrate the present disclosure, and the scope of the present disclosure is not limited thereto.

EXAMPLES

Example 1

LiOH and $GaF_3$ were mixed at a molar ratio of 3:1 to obtain a mixture, and this mixture was subject to high-energy milling for 10 minutes using Pulverisette 7 Premium line equipment after performing ball milling at a speed of 700 rpm for 18 hours. After the high-energy milling, the mixture was left alone (conditioning) for 5 minutes to undergo a cooling process (1 cycle). Such high-energy milling and conditioning processes were repeatedly carried out during a total of 72 cycles to obtain a composite having a composition given in Table 1 below in a crystalline state.

Examples 2 to 9

Composites having compositions given in Table 1 below were obtained in a crystalline state in the same manner as in Example 1, except that instead of $GaF_3$, $InF_3$, $CeF_3$, $LaF_3$, $ScF_3$, $TbF_3$, $GdF_3$, $NdF_3$, and $TmF_3$ were used respectively.

Example 10

A composite was obtained in a crystalline state in the same manner as in Example 1, except that the milling speed was changed from 700 rpm to 300 rpm and 1000 rpm.

Comparative Examples 1 to 3

Composites were obtained in the same manner as in Example 1, except that the mixing molar ratio of Li and $GaF_3$ was changed from 3:1 to 2:1, 4:1 and 1:1 respectively.

Comparative Examples 4 and 5

Composites having compositions given in Table 1 below were obtained in the same manner as in Example 1, except that $AlF_3$ and $YF_3$ were used respectively instead of $GaF_3$.

TABLE 1

| Example | Composition of starting material | Composition of composite |
|---|---|---|
| Example 1 | Mixture of LiOH and $GaF_3$ having molar ratio of 3:1 | 3LiF—$Ga_2O_3$ |
| Example 2 | Mixture of LiOH and $InF_3$ having molar ratio of 3:1 | 3LiF—$In(OH)_3$ |
| Example 3 | Mixture of LiOH and $CeF_3$ having molar ratio of 3:1 | 3LiF—$Ce_2O_3$ |
| Example 4 | Mixture of LiOH and $LaF_3$ having molar ratio of 3:1 | 3LiF—$La_2O_3$ |
| Example 5 | Mixture of LiOH and $ScF_3$ having molar ratio of 3:1 | 3LiF—$Sc_2O_3$ |
| Example 6 | Mixture of LiOH and $TbF_3$ having molar ratio of 3:1 | 3LiF—$Tb_2O_3$ |
| Example 7 | Mixture of LiOH and $GdF_3$ having molar ratio of 3:1 | 3LiF—$Gd_2O_3$ |
| Example 8 | Mixture of LiOH and $NdF_3$ having molar ratio of 3:1 | 3LiF—$Nd_2O_3$ |
| Example 9 | Mixture of LiOH and $TmF_3$ having molar ratio of 3:1 | 3LiF—$Tm_2O_3$ |
| Example 10 | Mixture of LiOH and $GaF_3$ having molar ratio of 3:1 | 3LiF—$Ga_2O_3$ |
| Example 11 | Mixture of LiOH and $GaF_3$ having molar ratio of 3:1 | 3LiF—$Ga_2O_3$ |
| Comparative Example 1 | Mixture of LiOH and $GaF_3$ having molar ratio of 2:1 | $x$LiF—$y$$Ga_2O_3$ ($1.8 \leq x \leq 2.2$, $0.8 \leq y \leq 1.2$) |
| Comparative Example 2 | Mixture of LiOH and $GaF_3$ having molar ratio of 4:1 | 3LiF—$LiGaO_2$ |
| Comparative Example 3 | Mixture of LiOH and $GaF_3$ having molar ratio of 1:1 | $Ga(OH, F)_3 \cdot xH_2O$ (x = 0 or $0 < x \leq 1.5$) |
| Comparative Example 4 | Mixture of LiOH and $AlF_3$ having molar ratio of 3:1 | 3LiF—$Al_2O_3$ |
| Comparative Example 5 | Mixture of LiOH and $YF_3$ having molar ratio of 3:1 | 3LiF—$Y(OH)_3$ |

Preparation Example 1

A cathode active material having an aLi2O—ZrO2 coating film was prepared according to the following method.

Lithium methoxide, zirconium propoxide, ethanol, and ethyl acetoacetate were stirred and mixed for 30 minutes in a mixed solution to prepare an alcohol solution (aLi$_2$O—ZrO$_2$ coating solution) of aLi$_2$O—ZrO$_2$ (a=1). Here, the content of lithium methoxide and zirconium propoxide was adjusted such that the content of aLi$_2$O—ZrO$_2$ (a=1) applied on the surface of the cathode active material LiNi$_{0.8}$Co$_{0.15}$Mn$_{0.5}$O$_2$ (NCM) was 0.5 mole percent (mol %), based on a total content of the cathode active material.

Next, the aLi$_2$O—ZrO$_2$ coating solution was mixed with the cathode active material LiNi$_{0.8}$Co$_{0.15}$Mn$_{0.05}$O$_2$ (NCM) fine powder, and this mixed solution was heated to about 40° C. while stirring to evaporate and dry a solvent such as alcohol. At this time, the mixed solution was irradiated with ultrasonic waves.

Through the above process, a precursor of aLi$_2$O—ZrO$_2$ was supported on the particle surface of the cathode active material fine powder.

The precursor of aLi$_2$O—ZrO$_2$ (a=1) supported on the particle surface of the cathode active material fine powder was heat-treated at about 350° C. for 1 hour under an oxygen atmosphere. In this heat treatment process, the precursor of aLi$_2$O—ZrO$_2$ (a=1) present on the cathode active material was changed to aLi$_2$O—ZrO$_2$ (a=1). The content of Li$_2$O—ZrO$_2$ (LZO) is about 0.4 parts by weight based on 100 parts by weight of NCM.

According to the above-described preparation process, LiNi$_{0.8}$Co$_{0.15}$Mn$_{0.05}$O$_2$ (NCM) having an aLi$_2$O—ZrO$_2$ coating film was obtained. In aLi$_2$O—ZrO$_2$, a is 1.

Manufacture of All-Solid Secondary Battery

Manufacture Example 1

Cathode Layer

The LiNi$_{0.8}$Co$_{0.15}$Mn$_{0.05}$O$_2$ (NCM) coated with Li$_2$O—ZrO$_2$ (LZO) obtained according to Preparation Example 1 was prepared as a cathode active material.

The composite powder prepared in Example 1 was prepared as a solid electrolyte. Carbon nanofibers (CNF) were prepared as a conductive agent. These materials were mixed at a weight ratio of cathode active material:solid electrolyte:conductive agent=60:35:5, and the mixture was molded in the form of a sheet to prepare a cathode sheet. The prepared cathode sheet was pressed onto a cathode current collector made of a carbon-coated aluminum foil having a thickness of 18 µm to prepare a cathode layer. The thickness of the cathode active material layer was about 100 µm.

Anode Layer

A lithium metal layer having a thickness of about 30 µm was used as an anode layer Solid Electrolyte Layer One part by weight of a styrene-butadiene rubber (SBR) binder was added to 100 parts by weight of a crystalline argyrodite-based solid electrolyte (Li$_6$PS$_5$Cl) to prepare a mixture. Xylene and diethylbenzene was added to this mixture and simultaneously stirred to prepare a slurry. The prepared slurry was applied onto a non-woven fabric using a blade coater, and was dried in air at 40° C. to obtain a laminate. The laminate was dried in vacuum at 40° C. for 12 hours. A solid electrolyte layer was prepared by the above process.

The solid electrolyte layer was disposed on the anode layer, and the cathode layer was disposed on the solid electrolyte layer to prepare a laminate. The prepared laminate was plate-pressed by a pressure of 100 MPa at 25° C. for 10 minutes. The solid electrolyte layer was sintered by the plate-pressing treatment to improve battery characteristics.

Manufacture Examples 2 to 11

All-solid secondary batteries were manufactured in the same manner as in Manufacture Example 1, except that the composites of Examples 2 to 11 were used instead of the composite of Example 1.

Comparative Manufacture Examples 1 to 5

All-solid secondary batteries were manufactured in the same manner as in Manufacture Example 1, except that the composites of Comparative Examples 1 to 5 were used instead of the composite of Example 1.

Evaluation Example 1: X-ray Diffraction (XRD) Analysis (1) Example 1 and Comparative Examples 1 to 3

XRD spectra of the composites obtained according to Example 1 and Comparative Examples 1 to 3 were measured, and the results are shown in FIG. 1A. Cu Kα radiation was used for XRD spectrum measurement, and X-ray diffraction analysis was performed using D8 Advance of Bruker Corporation.

Figure 1B:
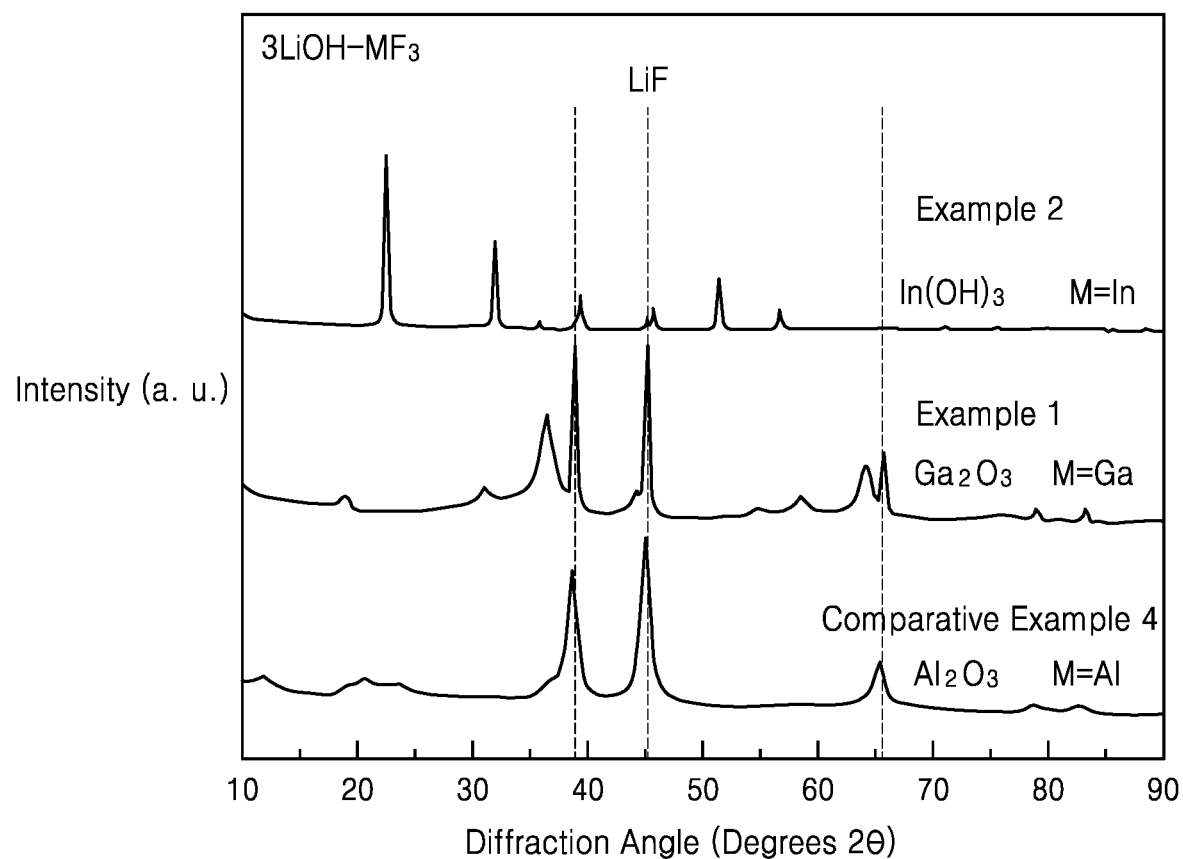
FIG. 1B is a graph of intensity (arbitrary units, a.u.) versus diffraction angle (degrees, 2θ) and illustrates X-ray diffraction (XRD) spectra for the composites of Examples 1 and 2 and the composite of Comparative Example 4.

Referring to FIG. 1A, in the composite of Example 1, a primary peak A was observed at a diffraction angle of 35° 2θ to 38° 2θ, a secondary peak B was observed at a diffraction angle of 30° 2θ to 32° 2θ, a secondary peak C was observed at a diffraction angle of 57° 2θ to 60° 2θ, and a secondary peak D at a diffraction angle of 63° 2θ to 65° 2θ. Further, as shown in FIG. 1A, in the compound of Example 1, peaks related to LiGaO$_2$, GaF$_3$, and LiOH were not observed. The secondary peak appearing at a diffraction angle of 63° 2θ to 65° 2θ is a peak related to a metal oxide such as Ga$_2$O$_3$, as shown in FIG. 1B.

In the composites of Comparative Examples 1 to 3, as shown in FIG. 1A, LiGaO$_2$ or a product in which other by-products are mixed was obtained, so that the composites of Comparative Examples 1 to 3 exhibited different diffraction angle characteristics from the composite of Example 1.

The intensity ratio of primary peak A and secondary peak B, C or D of the composite was measured, and the results thereof were given in Table 2 below.

TABLE 2

| Example | Intensity ratio of primary peak A and secondary peak B | Intensity ratio of primary peak A and secondary peak C | Intensity ratio of primary peak A and secondary peak D |
|---|---|---|---|
| Example 1 | 1:0.282 | 1;0.297 | 1:0.373 |
| Comparative Example 1 | 1:0.266 | 1:0.296 | 1:2.228 |
| Comparative Example 2 | 1:0.175 | 1:0.359 | 1:0.236 |
| Comparative Example 3 | 1:0.272 | 1:0.026 | 1:2.136 |

The intensity ratios of the primary peak and the secondary peaks of the composites of Comparative Examples 1 to 3 are compared with the intensity ratios of the primary and second peaks at the corresponding diffraction angles of the composite of Example 1. That is, with respect to the diffraction angle range of the primary peak and secondary peak corresponding to the composite of Example 1, comparison values between the peaks shown in Comparative Examples 1 to 3 are indicated.

(2) Examples 1 and 2 and Comparative Example 4

XRD spectra of the composites obtained according to Examples 1 and 2 and Comparative Example 4 were measured, and
the results are shown in FIG. 1B. Cu Kα radiation was used for XRD spectrum measurement, and X-ray diffraction analysis was performed using D8 Advance of Bruker Corporation.

Referring to FIG. 1B, in the composite of Example 2, as compared with the composite of Example 1, a peak corresponding to $In(OH)_3$ was observed. In the composite of Example 2, a primary peak A-1 (22° 2θ to 23° 2θ) and a secondary peak B-1 (31° 2θ to 33° 28θ) (56.7%) were observed, and a diffraction peak corresponding to $In_2O_3$ was not observed. Thus, the composition of the composite of Example 2 may be confirmed.

The intensity ratios of primary peak A-1 and secondary peak B-1 were measured, and the results thereof are given in Table 3 below.

TABLE 3

| Example | Intensity ratios of primary peak A-1 and secondary peak B-1 |
| --- | --- |
| Example 1 | 1:0.567 |
| Example 2 | 1:0.567 |

In the composite obtained according to Comparative Example 4, the above peaks were not observed.

Evaluation Example 2

Measurement of Ion Conductivity and Activation Energy

After 0.2 g of sample of each of the composites of Example 1 to 9 and the composites of Comparative Example 1 to 5 was placed between SUS (stainless steel) plates each having a diameter of 16 mm and a thickness of 500 μm to form a SUS/composite/SUS structure, an uniaxial pressure of 100 kg to 200 kg was applied to the SUS/composite/SUS structure for 10 seconds to prepare a circular SUS/sold electrolyte/SUS structure.

Figure 2A:
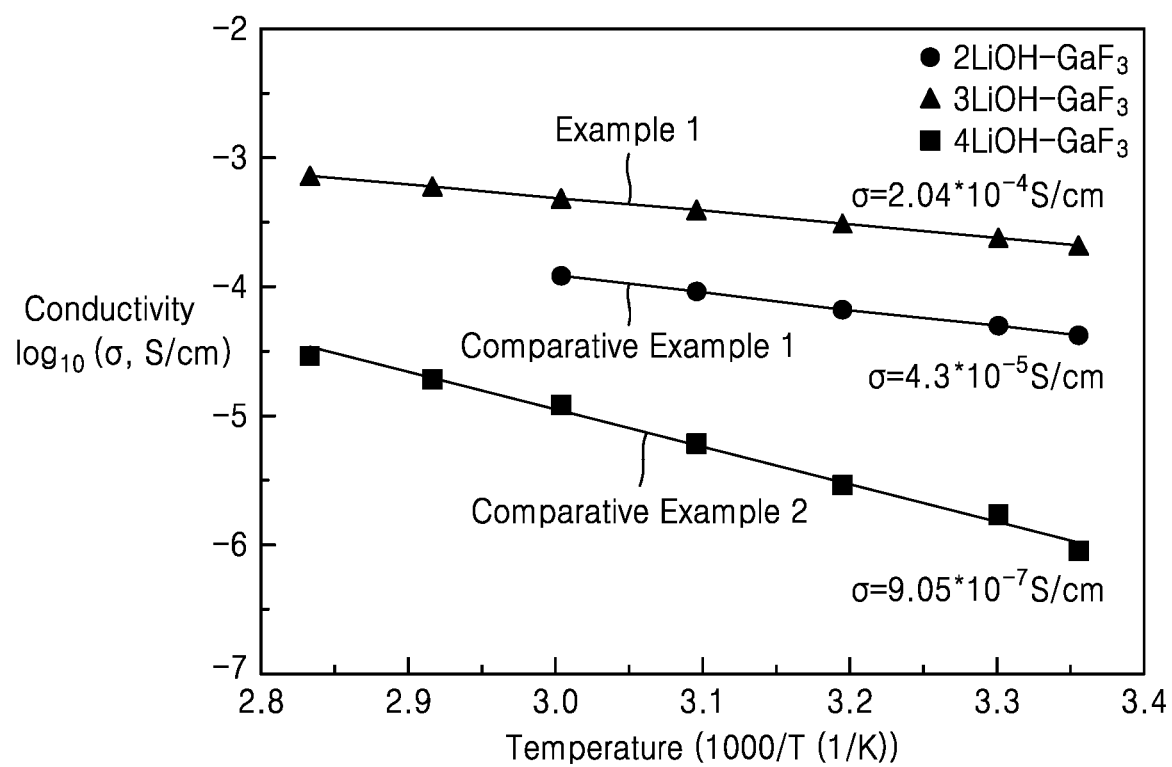
FIG. 2A is a graph of conductivity (σ, Siemens per centimeter, S/cm) versus temperature (1000/T, 1/Kelvin, 1/K) illustrating the conductivity of a solid electrolyte containing the composite of Example 1 and solid electrolytes containing the composites of Comparative Examples 1 and 2.

Resistance values of the SUS/sold electrolyte/SUS structure were measured in a temperature range of −20° C. to 80° C. while changing 10 mV AC from 1 MHz to 0.01 Hz as compared with an open circuit voltage by introducing a method of measuring a potential-static impedance for the SUS/sold electrolyte/SUS structure. Impedance evaluation was conducted, and the results thereof are shown in FIG. 2A.

The total resistance (Rtotal) value is obtained from the impedance results, and an electrode area and a pellet thickness are corrected from this value to calculate a conductivity value. Further, when measuring EIS, an activation energy (Ea) value for Li ion conduction was calculated from the results measured by changing the temperature of a chamber tin which each oxide sample was loaded. Ea may be calculated from a slope value obtained by converting the conductivity value measured for each temperature in the range of 298 K to 378K into an Arrhenius plot (Ln (σT) vs. 1/T) of Equation 1 below.

$$\sigma T = A \exp(Ea/RT) \quad \text{Equation 1}$$

In Equation 1, Ea represents activation energy, T represents absolute temperature, A represents pre-exponential factor, R represents gas constant, and σ represents conductivity.

Figure 2B:
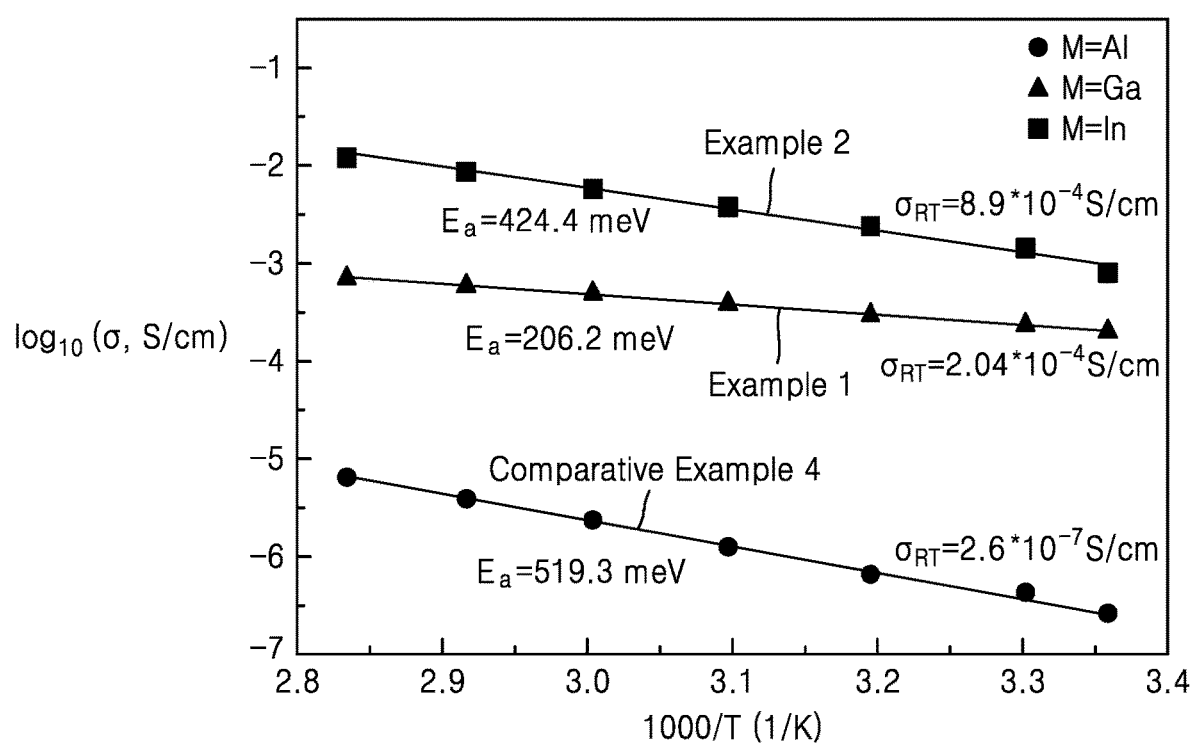
FIG. 2B is a graph of conductivity (σ, Siemens per centimeter, S/cm) versus temperature (1000/T, 1/Kelvin, 1/K) illustrating the conductivity of solid electrolytes containing the composite of Examples 1 and 2 and a solid electrolyte containing the composite of Comparative Example 4.

The activation energy obtained according to the above process is shown in Table 4 below, and the ion conductivity of some of the solid electrolytes is shown in FIGS. 2A and 2B. FIG. 2A shows the ion conductivity of the solid electrolytes containing the composites of Example 1, Comparative Example 1 and Comparative Example 2, and FIG. 2B shows the ion conductivity of the solid electrolytes containing the composites of Examples 1 and 2 and Comparative Example 4.

TABLE 4

| Example | Composition of starting material | Composition of composite | Ion conductivity (@RT, S/cm) | Activation energy (meV) |
| --- | --- | --- | --- | --- |
| Example 1 | Mixture of LiOH and $GaF_3$ having molar ratio of 3:1 | $3LiF—GaO_3$ | $2.04 \times 10^{-4}$ | 206.16 |
| Example 2 | Mixture of LiOH and $InF_3$ having molar ratio of 3:1 | $3LiF—In(OH)_3$ | $8.9 \times 10^{-4}$ | 424.37 |
| Comparative Example 1 | Mixture of LiOH and $xLiF—yGaO_3$ $GaGaF_3$ having molar ratio of 2:1 | $1.8 \leq x \leq 2.2$ | $4.3 \times 10^{-5}$ | 263.15 |
| Comparative Example 2 | Mixture of LiOH and $GaGaF_3$ having molar ratio of 4:1 | $3LiF—LiGaO_2$ | $9.05 \times 10-7$ | 571.55 |
| Comparative Example 3 | Mixture of LiOH and $Ga(OH,F)_3 \cdot xH_2O$ $GaF_3$ having molar ratio of 1:1 | x = 0 or $0 < x \leq 1.5$ | NA | — |
| Comparative Example 4 | Mixture of LiOH and $AlF_3$ having molar ratio of 3:1 | $3LiF—Al_2O_3$ | $2.64 \times 10-7$ | 653.92 |
| Comparative Example 5 | Mixture of LiOH and $YF_3$ having molar ratio of 3:1 | $3LiF—Y(OH)_3$ | NA | — |

As shown in FIGS. 2A and 2B, it may be found that the solid electrolytes containing the composites of Examples 1 and 2 have excellent conductivity in various temperature ranges. The solid electrolyte containing the composite of Example 1 exhibits excellent conductivity of $2.049 \times 10^{-4}$ S/cm at room temperature. As shown in FIG. 4A, the compound of Example 2 exhibits excellent ion conductivity of $8.9 \times 10^{-4}$ S/cm at room temperature (25° C.), and exhibits activation energy of about 424.4 meV.

Further, the ion conductivity of the solid electrolytes containing the composites of Examples 3 to 9 is substantially equal to that of Example 1, which shows excellent results. From the results, it may be found that the ion conductivity of the solid electrolytes containing the composites of Examples 1 to 9 is significantly improved as compared with that of Comparative Examples 1 to 5. The ion conductivity of the compound of Comparative Example 3 and the solid electrolyte containing the composite of Comparative Example 5 is too low to be measured because the ion conductivity thereof is outside the measurement range of ion conductivity.

Further, the solid electrolytes containing the composites of Examples 1 to 9 have a low activation energy value of less than 425 meV/atom as compared with the activation energy value of the solid electrolytes containing the composites of Comparative Examples 1 to 3. When the activation energy is lowered in this way, the ionic conductivity is improved at low temperatures.

Evaluation Example 3

Charge and Discharge Profile

The solid secondary battery of Manufacture Example 1 was charged and discharged at a current rate of 0.2 mA/cm$^2$ at 60° C. in a voltage range of 2.85 V to 4.2 V. The solid secondary battery was charged with a constant current of 0.067 C for 15 hours until a battery voltage reached 4.2 V, and was then discharged charged to a constant current of 0.067 C for 15 hours until the battery voltage reached 2.85 V.

After charging and discharging, a voltage profile was examined.

Referring to this, it may be found that the solid electrolyte containing the composite of Example 1 has excellent compatibility with a garnet solid electrolyte. Further, it may be found that a capacity of about 3 mAh/cm$^2$, which is almost close to the design capacity of a cathode of 3.2 mAh/cm$^2$ is reversibly exhibited. It may be found that the solid secondary battery of Manufacture Example 1 has excellent compatibility with LLZO garnet, and the solid electrolyte in the secondary battery may be practically used.

Further, the charge and discharge profiles of the batteries of Comparative Manufacture Examples 1 to 5 were evaluated. As a result of evaluation, compared with the case of Manufacture Example 1, characteristics deteriorate.

Evaluation Example 4

Charge and Discharge Profile and Cycle Characteristics

The solid secondary battery of Manufacture Example 1-1 and the solid secondary battery of Comparative Manufacture Example 6 were charged and discharged at a current rate of 0.3 mA/cm$^2$ under the same conditions as Evaluation Example 8, that is, at 60° C. in a voltage range of 2.85 V to 4.2 V Evaluation of cycle characteristics was performed by putting the all-solid secondary battery into a thermostat at 60° C.

The solid secondary battery was charged with a constant current of 0.1 C for 10 hours until a battery voltage reached 4.2 V, and was then discharged charged to a constant current of 0.1 C for 20 hours until the battery voltage reached 2.85 V (first cycle).

After carrying out one cycle charge and discharge, voltage profiles and cycle characteristics were examined.

As a result of evaluation, it may be found that the solid electrolyte for a cathode in the solid secondary battery of Manufacture Example 1-1 may be practically used, thereby enabling the driving of the battery. Further, it may be found that the solid secondary battery of Manufacture Example 1-1 exhibits improve cycle characteristics as compared with the solid secondary battery of Comparative Manufacture Example 6.

Heretofore, one embodiment has been described with reference to the drawings and examples, but this is only illustrative, and those skilled in the art will understand that various modifications and equivalent other embodiments are possible therefrom. Therefore, the protective scope of this application should be determined by the appended claims.

Since a solid electrolyte according to an embodiment exhibits improved ion conductivity at room temperature, it may be used as an excellent lithium ion conductor. Further, since the solid electrolyte has improved lithium stability and high oxidation potential, it may be used as an electrolyte for cathodes.

It should be understood that embodiments described herein should be considered in a descriptive sense only and not for purposes of limitation. Descriptions of features or aspects within each embodiment should be considered as available for other similar features or aspects in other embodiments. While an embodiment has been described with reference to the figures, it will be understood by those of ordinary skill in the art that various changes in form and details may be made therein without departing from the spirit and scope as defined by the following claims.

What is claimed is:

1. A solid electrolyte comprising:
   a crystalline composite, wherein the crystalline composite comprises a compound represented by Formula 1, a compound represented by Formula 2, or a combination thereof $$3(LiF)M1_2O_3 \qquad \text{Formula 1}$$

wherein, in Formula 1, M1 is an element having an oxidation number of +3, or a combination thereof, with the proviso that M1 is not aluminum, yttrium, lanthanum, or ytterbium, $$3(LiF)M2(OH)_3 \qquad \text{Formula 2}$$

wherein, in Formula 2, M2 is an element having an oxidation number of +3, or a combination thereof, with the proviso that M2 is not aluminum or yttrium, and
   wherein, the crystalline composite comprises a product obtained by mechanochemical mixing of lithium hydroxide and a metal fluoride wherein a molar ratio of the lithium hydroxide and the metal fluoride is about 3:1.

2. The solid electrolyte of claim 1, wherein the crystalline composite comprises a compound represented by Formula 1, and in Formula 1, M1 is Ga, Sc, Ce, Pr, Nd, Pm, Sm, Bu, Gd, Tb, Dy, Ho, Er, Tm, or a combination thereof.

3. The solid electrolyte of claim 1, wherein the crystalline composite comprises a compound represented by Formula 2, and in Formula 2, M2 is In, or M2 is In and Ga, Sc, a lanthanide element, or a combination thereof.

4. The solid electrolyte of claim 1, wherein the crystalline composite is $3(LiF)Ga_2O_3$, $3(LiF)In(OH)_3$, $3(LiF)Sc_2O_3$, $3(LiF)Ce_2O_3$, $3(LiF)Pr_2O_3$, $3(LiOH)EuF_3$, $3(LiF)Eu_2O_3$, $3(LiF)Nd_2O_3$, $3(LiF)Tb_2O_3$, $3(LiF)Gd_2O_3$, $3(LiF)Sm_2O_3$, $3(LiF)Ho_2O_3$, $3(LiF)Tm_2O_3$, or a combination thereof.

5. The solid electrolyte of claim 1, wherein the crystalline composite, when analyzed by X-ray diffraction using CuKα radiation, has
   a primary peak at a diffraction angle of about 35° 2θ to about 38° 2θ, and
   secondary peaks at a diffraction angle of about 30° 2θ to about 32° 2θ, about 57° 2θ to about 60° 2θ, and at about 63° 2θ to about 65° 2θ.

6. The solid electrolyte of claim 1, wherein the crystalline composite does not have a peak at a diffraction angle of about 23° 2θ to about 27° 2θ when analyzed by X-ray diffraction using CuKα radiation.

7. The solid electrolyte of claim 5, wherein:
   an intensity ratio of the primary peak to the peak at the diffraction angle of about 30° 2θ to about 32° 2θ is about 1:0.25 to about 1:0.35,
   an intensity ratio of the primary peak to the peak at the diffraction angle of about 57° 2θ to about 60° 2θ is about 1:0.25 to about 1:0.35, and
   an intensity ratio of the primary peak to the peak at the diffraction angle of about 63° 2θ to about 65° 2θ is about 1:0.3 to about 1:0.5.

8. The solid electrolyte of claim 1, wherein the crystalline composite, when analyzed by X-ray diffraction using CuKα radiation, has
- a primary peak at a diffraction angle of about 22° 2θ to about 23° 2θ, and
- a peak at a diffraction angle of about 31° 2θ to about 33° 2θ, and
- an intensity ratio of the primary peak to the peak at the diffraction angle of about 31° 2θ to about 33° 2θ is about 1:0.5 to about 1:0.6.

9. The solid electrolyte of claim 1, wherein the crystalline composite, when analyzed by X-ray diffraction using CuKα radiation, has
- a primary peak at a diffraction angle of about 22° 2θ to about 23° 2θ,
- secondary peaks at a diffraction angle of about 31° 2θ to about 33° 2θ, at a diffraction angle of about 50° 2θ to about 52° 2θ, and at a diffraction angle of about 55° 2θ to about 57° 2θ, and
- an intensity ratio of the primary peak to the secondary peak at the diffraction angle of about 31° 2θ to about 33° 2θ is about 1:0.5 to about 1:0.6, an intensity ratio of the primary peak and the secondary peak at a diffraction angle of about 50° 2θ to about 52° 2θ is about 1:0.4 to about 1:0.45, and an intensity ratio of the primary peak and the secondary peak at the diffraction angle of about 55° 2θ to about 57° 2θ is about 1:0.15 to about 1:0.18.

10. The solid electrolyte of claim 1, wherein the solid electrolyte has an ion conductivity of about $1 \times 10^4$ siemens per centimeter to about $1 \times 10^{-2}$ siemens per centimeter at 25° C.

11. An electrochemical device, comprising:
- a cathode;
- an anode; and
- an electrolyte disposed between the cathode and the anode,
- wherein at least one of the cathode, the anode, or the electrolyte comprises the solid electrolyte of claim 1.

12. The electrochemical device of claim 11, wherein the electrochemical device is at least one of an electrochemical cell, a storage battery, a super capacitor, a fuel cell, a sensor, or a discoloring device.

13. An electrochemical cell, comprising:
- a cathode;
- an anode; and
- an electrolyte disposed between the cathode and the anode,
- wherein at least one of the cathode, the anode, or the electrolyte comprises the solid electrolyte of claim 1.

14. The electrochemical cell of claim 13, wherein the electrochemical cell is a secondary battery comprising the cathode, the anode, and a solid electrolyte layer disposed between the cathode and the anode, and
- at least one of the cathode, the anode, or the solid electrolyte layer comprises the solid electrolyte.

15. The electrochemical cell of claim 14, wherein the anode is an electrode comprising a lithium metal or a lithium alloy.

16. The electrochemical cell of claim 14, further comprising a protective film on the cathode, the anode, the solid electrolyte layer, or a combination thereof, wherein the protective film comprises the solid electrolyte.

17. The electrochemical cell of claim 13, wherein the electrochemical cell is a solid secondary battery.

18. The electrochemical cell of claim 17, wherein the solid secondary battery further comprises an oxide solid electrolyte, a sulfide solid electrolyte, or a combination thereof.

19. The electrochemical cell of claim 18, wherein the oxide solid electrolyte comprises a garnet ceramic having the formula $Li_{3+x}La_3M_2O_{12}$, wherein M=Te, Nb, Zr, or a combination thereof, and x is an integer of 1 to 10, a lithium phosphorus oxynitride having the formula $Li_xPO_yN_z$, wherein 0<x<1, 0<y<1, and 0<z<1, $Li_xP_yO_zN_K$, wherein 2.7≤x≤3.3, 0.8≤y≤1.2, 3.5≤z≤3.9, and 0.1≤k≤0.5, $Li_wPO_{x-}N_yS_z$, wherein 0<w<1, 0<x<1, 0<y<1, and 0<z<1, $Li_{1+x+y}Al_xTi_{2-x}Si_yP_{3-y}O_{12}$, wherein 0<x<2, 0≤y<3, $BaTiO_3$, $Pb(Zr_xTi_{1-x})O_3$, wherein 0≤x≤1, $Pb_{1-x}La_xZr_{1-y}Ti_yO_3$, wherein 0≤x<1, and 0≤y<1, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate having the formula $Li_3PO_4$, lithium titanium phosphate having the formula $Li_xTi_y(PO_4)_3$, wherein 0<x<2, and 0<y<3, lithium aluminum titanium phosphate having the formula $Li_xAl_yTi_z(PO_4)_3$, wherein 0<x<2, 0<y<1, and 0<z<3, $Li_{1+x+y}(Al_aGa_{1-a})_x(Ti_bGe_{1-b})_{2-x}Si_yP_{3-y}O_{12}$, wherein 0≤x≤1, 0≤y≤1, 0≤a≤1, and 0≤b≤1, lithium lanthanum titanate having the formula $Li_xLa_yTiO_3$, wherein 0<x<2, and 0<y<3, lithium germanium thiophosphate having the formula $Li_xGe_yP_zS_w$, wherein 0<x<4, 0<y<1, 0<z<1, and 0<w<5, lithium nitride glass having the formula $Li_xN_y$, wherein 0<x<4, and 0<y<2, $SiS_2(Li_xSi_yS_z)$, wherein 0<x<3, 0<y<2, and 0<z<4, $P_2S_5$ glass having the formula $Li_xP_yS_z$, wherein 0<x<3, 0<y<3, and 0<z<7, $Li_2O$, $LiF$, $LiOH$, $Li_2CO_3$, $LiAlO_2$, or a $Li_2O$—$Al_2O_3$—$SiO_2$—$P_2O_5$—$TiO_2$—$GeO_2$-based ceramic, or a combination thereof.

20. The electrochemical cell of claim 18, wherein the sulfide solid electrolyte comprises of $Li_2S$—$P_2S_5$, $Li_2S$—$P_2S_5$—LiX, wherein X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein m and n are each a positive number, and Z is at least one of Ge, Zn, or Ga, $Li_2S$—$GeS_2$, $Li_2S$—$SiS_2$—$Li_3PO_4$, $Li_2S$—$SiS_2$—$Li_pMO_q$, wherein p and q are each a positive number, and M is at least one of P, Si, Ge, B, Al, Ga, or In, $Li_{7-x}PS_{6-x}Cl_x$, wherein 0≤x≤2, $Li_{7-x}PS_{6-x}Br_x$, wherein 0≤x≤2, or $Li_{7-x}PS_{6-x}I_x$, wherein 0≤x≤2, or a combination thereof.

21. A method of preparing the solid electrolyte of claim 1, the method comprising:
- providing a mixture of lithium hydroxide and metal fluoride at a mixing molar ratio of about 3:1; and
- mechanochemically mixing of the mixture to prepare the solid electrolyte.

22. The method of claim 21, further comprising: conditioning a product obtained from the mechanochemical mixing.

23. The method of claim 21, wherein a product obtained from the mechanochemical mixing is conditioned at a temperature of about 20° C. to about 60° C.

24. The method of claim 21, wherein the mechanochemically mixing is performed by mechanical milling, and the mechanical milling comprises ball milling, air jet milling, bead milling, roll milling, planetary milling, hand milling, high-energy milling, planetary ball milling, stirred ball milling, vibration milling, mechanofusion milling, shaker milling, attritor milling, disk milling, shape milling, nauta milling, nobilta milling, or high-speed mixing, or a combination thereof.

25. The method of claim 24, wherein the mechanical milling is high-energy milling.

26. The method of claim 21, wherein the metal fluoride is
a fluoride comprising Ga, Sc, a lanthanide element, or a combination thereof,
indium fluoride, or
a fluoride comprising i) indium and ii) Ga, Sc, a lanthanide element, or a combination thereof.

27. The method of claim 21, wherein the metal fluoride comprises $GaF_3$, $InF_3$, $ScF_3$, $LaF_3$, $CeF_3$, $PrF_3$, $EuF_3$, $NdF_3$, $TbF_3$, $GdF_3$, $SmF_3$, $HoF_3$, $TmF_3$, or a combination thereof.

28. A protected cathode, comprising
a cathode; and
a protective film comprising the solid electrolyte of claim 1 on the cathode.

29. A protected anode, comprising
an anode; and
a protective film comprising the solid electrolyte of claim 1 on the anode.

* * * * *